US012768487B2

(12) United States Patent
Hou et al.

(10) Patent No.: US 12,768,487 B2
(45) Date of Patent: Oct. 20, 2026

(54) PIPELINE SCALE REMOVAL

(71) Applicant: Saudi Arabian Oil Company, Dhahran (SA)

(72) Inventors: Jian Hou, Beijing (CN); Tianping Huang, Beijing (CN); Wei Li, Beijing (CN); Tao Chen, Dhahran (SA)

(73) Assignee: Saudi Arabian Oil Company, Dhahran (SA)

(*) Notice: Subject to any disclaimer, the term of this patent is extended or adjusted under 35 U.S.C. 154(b) by 43 days.

(21) Appl. No.: 18/753,633

(22) Filed: Jun. 25, 2024

(65) Prior Publication Data

US 2025/0389367 A1 Dec. 25, 2025

(51) Int. Cl.

*F16L 55/40* (2006.01)
*B08B 9/055* (2006.01)
*F16L 55/38* (2006.01)

(52) U.S. Cl.

CPC ............ *F16L 55/40* (2013.01); *B08B 9/0557* (2013.01); *F16L 55/38* (2013.01); *B08B 2209/0556* (2013.01)

(58) Field of Classification Search

CPC ........ F16L 55/38; F16L 55/40; B08B 9/0557; B08B 2209/0556

See application file for complete search history.

(56) References Cited

U.S. PATENT DOCUMENTS

| | | | | |
|---|---|---|---|---|
| 1,842,563 A * | 1/1932 | Oberhuber | B08B 9/0553 | 15/104.061 |
| 3,704,478 A * | 12/1972 | Vernooy | B08B 9/0553 | 15/104.061 |
| 4,069,535 A * | 1/1978 | Cato | B08B 9/0557 | 15/104.061 |
| 4,081,875 A * | 4/1978 | Nishino | B08B 9/0553 | 15/104.061 |

(Continued)

FOREIGN PATENT DOCUMENTS

| | | |
|---|---|---|
| CN | 204897543 | 12/2015 |
| CN | 210876625 U * | 6/2020 |

(Continued)

OTHER PUBLICATIONS

CN 210876625 U—English Machine Translation (Year: 2020).*

(Continued)

*Primary Examiner* — Marc Carlson

(74) *Attorney, Agent, or Firm* — DINSMORE & SHOHL LLP

(57) ABSTRACT

A pipeline pig includes a main body with a conduit extending therethrough which defines a conical inlet converging to a throat and a conical outlet diverging from the throat such that the conduit is venturi-shaped. The pig further includes turbine blades disposed in the conical outlet about a longitudinal axis of the conduit and one or more scraper heads. When the pig is disposed within the pipe, the longitudinal axis of the conduit is parallel to and coincident with a longitudinal axis of the pipe, and, as a fluid flowing in the (Continued)

pipe pushes the pig through the pipe, at least a portion of the fluid flows into the conduit and through the throat and thence across the turbine blades, thereby imparting rotation on the one or more scraper heads as the scraper heads scrape the interior wall of the pipe.

20 Claims, 6 Drawing Sheets

(56) References Cited

U.S. PATENT DOCUMENTS

| | | | | |
|---|---|---|---|---|
| 4,083,074 | A * | 4/1978 | Curtis | B08B 9/0553<br>166/170 |
| 4,122,575 | A * | 10/1978 | Sagawa | B08B 9/0553<br>15/104.061 |
| 4,425,385 | A * | 1/1984 | Coulter | B08B 9/0557<br>427/230 |
| 4,595,047 | A * | 6/1986 | Estienne | F28F 13/125<br>165/95 |
| 5,384,929 | A * | 1/1995 | Smith | B08B 9/0553<br>15/104.061 |
| 5,533,224 | A * | 7/1996 | Knapp | B08B 9/0553<br>15/104.061 |
| 6,370,721 | B1 * | 4/2002 | Torres, Jr. | B08B 9/0551<br>15/104.061 |
| 6,924,253 | B2 | 8/2005 | Palmer et al. | |
| 7,051,587 | B2 * | 5/2006 | Simpson | F16L 55/38<br>73/152.54 |
| 7,827,646 | B2 * | 11/2010 | Pruett | F16L 58/1009<br>15/104.061 |
| 8,650,694 | B2 * | 2/2014 | Pruett | F16L 55/38<br>15/104.03 |
| 8,650,695 | B2 * | 2/2014 | Pruett | B08B 9/053<br>15/104.062 |
| 9,649,661 | B2 | 5/2017 | Broze et al. | |
| 2007/0113362 | A1 * | 5/2007 | Lino | B08B 9/0553<br>15/104.061 |
| 2010/0180391 | A1 * | 7/2010 | Pruett | B08B 9/053<br>15/104.061 |
| 2016/0273992 | A1 * | 9/2016 | Frueh | F16L 55/40 |

FOREIGN PATENT DOCUMENTS

| | | | | |
|---|---|---|---|---|
| EP | 2825836 | B1 * | 5/2016 | B08B 9/0551 |
| GB | 2258284 | A * | 2/1993 | F16L 55/38 |
| GB | 2538517 | A * | 11/2016 | G01N 27/902 |
| JP | H06 206048 | A | 7/1994 | |
| KR | 20160056439 | A * | 5/2016 | B08B 9/027 |
| NO | 20150903 | A1 * | 1/2016 | F16L 55/44 |
| WO | WO-0030773 | A1 * | 6/2000 | B08B 9/0557 |
| WO | WO-2016185193 | A1 * | 11/2016 | G01B 7/34 |

OTHER PUBLICATIONS

International Search Report and Written Opinion in International Appln. No. PCT/US2025/035081, mailed on Nov. 19, 2025, 19 pages.

Kamal et al., "Oilfield scale formation and chemical removal: A review," Journal of Petroleum Science and Engineering, 2018, 171:127-139, 13 pages.

* cited by examiner

PIPELINE SCALE REMOVAL

TECHNICAL FIELD

The present disclosure relates to cleaning undesirable materials from an inner surface of a pipe or other tubular conveyance.

BACKGROUND

Pipes that carry fluids, for example, petroleum, natural gas, multiphase fluids or other fluids, can sometimes be partially or completely clogged with undesirable material such as scale, rust, hydrates, or other materials that can form on the interior surface of the pipes. Pipes can be cleaned by inserting an apparatus-sometimes referred to as a "pig"-into the pipe. The pig can include blades which can scrape the interior surface of the pipe as the pig travels through the pipe, thereby dislodging the undesirable material.

SUMMARY

Certain aspects of the subject matter herein can be implemented as a scraper pig for cleaning an interior wall of a tubular pipe. The scraper pig includes a main body with a conduit extending therethrough. An interior surface of the conduit defines a conical inlet converging to a throat and a conical outlet diverging from the throat such that the conduit is venturi-shaped. The scraper pig further includes one or more scraper heads and a plurality of turbine blades. The turbine blades are disposed in the conical outlet about a longitudinal axis of the conduit. The scraper pig is configured such that, when the pig is disposed within the pipe, the longitudinal axis of the conduit is parallel to and coincident with a longitudinal axis of the pipe, and, as a fluid flowing in the pipe pushes the pig through the pipe, at least a portion of the fluid flows into the conduit and through the throat and thence across the plurality of turbine blades, thereby imparting rotation on the one or more scraper heads as the scraper heads scrape at least a portion of the interior wall of the pipe.

Certain aspects of the subject matter herein can be implemented as a pipeline system. The pipeline system includes a tubular pipe, a fluid flowing through the pipe, and a scraper pig for cleaning an interior wall of the tubular pipe. The scraper pig includes a main body with a conduit extending therethrough. An interior surface of the conduit defines a conical inlet converging to a throat and a conical outlet diverging from the throat such that the conduit is venturi-shaped. The scraper pig further includes one or more scraper heads and a plurality of turbine blades. The turbine blades are disposed in the conical outlet about a longitudinal axis of the conduit. The scraper pig is configured such that, when the pig is disposed within the pipe, the longitudinal axis of the conduit is parallel to and coincident with a longitudinal axis of the pipe, and, as a fluid flowing in the pipe pushes the pig through the pipe, at least a portion of the fluid flows into the conduit and through the throat and thence across the plurality of turbine blades, thereby imparting rotation on the one or more scraper heads as the scraper heads scrape at least a portion of the interior wall of the pipe.

Certain aspects of the subject matter herein can be implemented as a method. The method includes disposing a scraper pig into a tubular pipe of a pipeline system. The scraper pig includes a main body with a conduit extending therethrough. An interior surface of the conduit defining a conical inlet converging to a throat and a conical outlet diverging from the throat such that the conduit is venturi-shaped. The scraper pig further includes one or more scraper heads and a plurality of turbine blades. The turbine blades are disposed in the conical outlet about a longitudinal axis of the conduit. The method further includes flowing a fluid through the pipe, thereby pushing the pig through the pipe and dislodging, by the one or more scraper heads, material from the interior surface of the pipe, at least a portion of the fluid flowing into the conduit and through the throat and thence across the plurality of turbine blades, thereby imparting rotation on the one or more scraper heads as the scraper heads scrape at least a portion of the interior wall of the pipe.

The details of one or more embodiments are set forth in the accompanying drawings and the description below. Other features, objects, and advantages will be apparent from the description and drawings, and from the claims.

DETAILED DESCRIPTION

Pigs for removing scale from pipelines can be complex and sometimes provide only incomplete removal of scale. Also, conventional pigs can be unstable as they travel through the pipe, resulting in a stuck pig or otherwise suboptimal performance. In some embodiments of the present disclosure, scraper pig includes a venturi-shaped conduit extending through its main body. The pig also includes one or more scraper heads and a turbine assembly comprising a plurality of turbine blades. As the pig is driven through the pipe by the force of fluid flowing through the pipe, at least a portion of the fluid flows into the conduit and across the blades, imparting rotation on the scraper heads. In some embodiments, the pig includes a scale thickness sensor to provide the operator with confirmation of whether scale has been adequately removed.

Figure 1A:
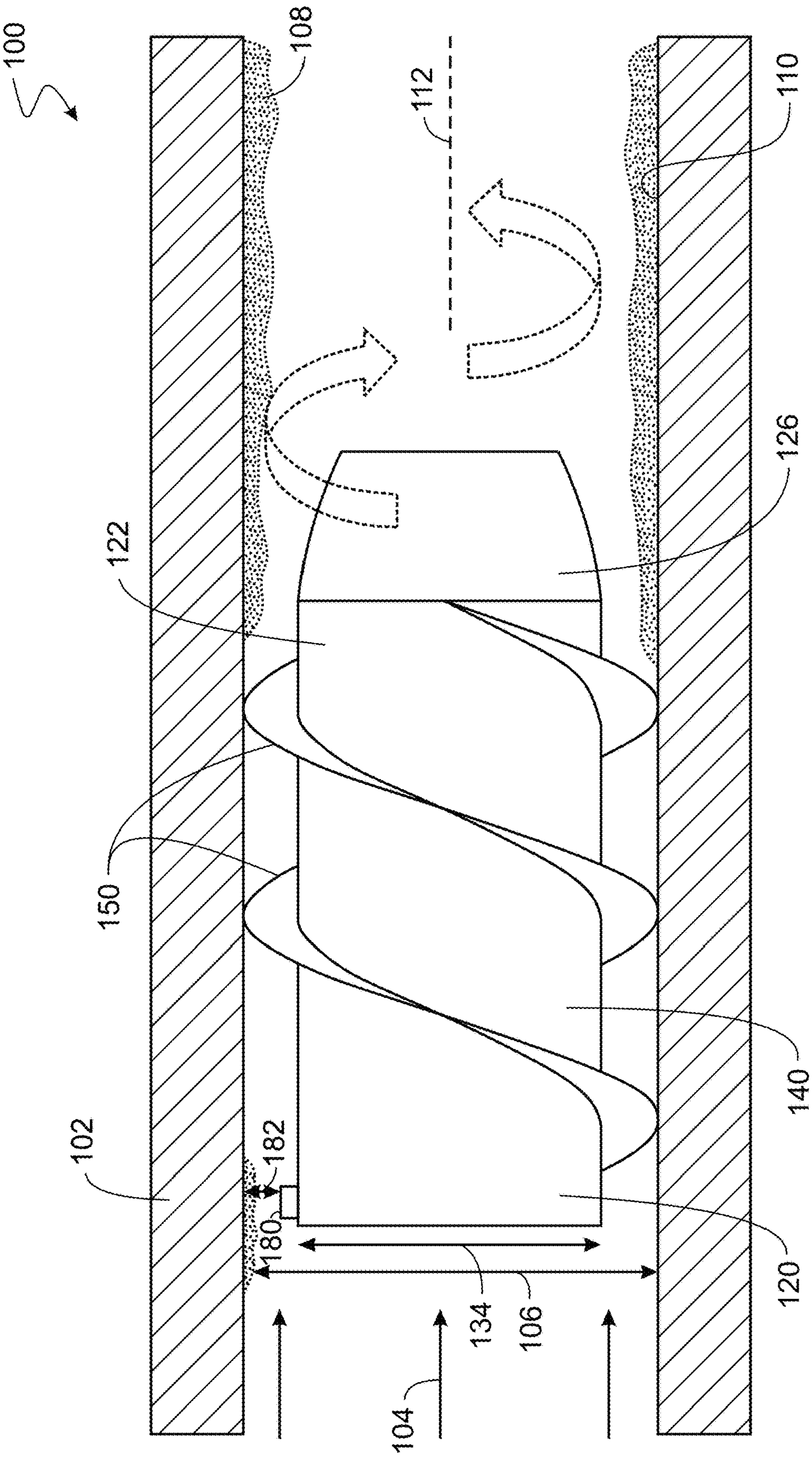
FIGS. 1A-1D are schematic illustrations of a pipeline pig in accordance with embodiments of the present disclosure.
Figure 1B:
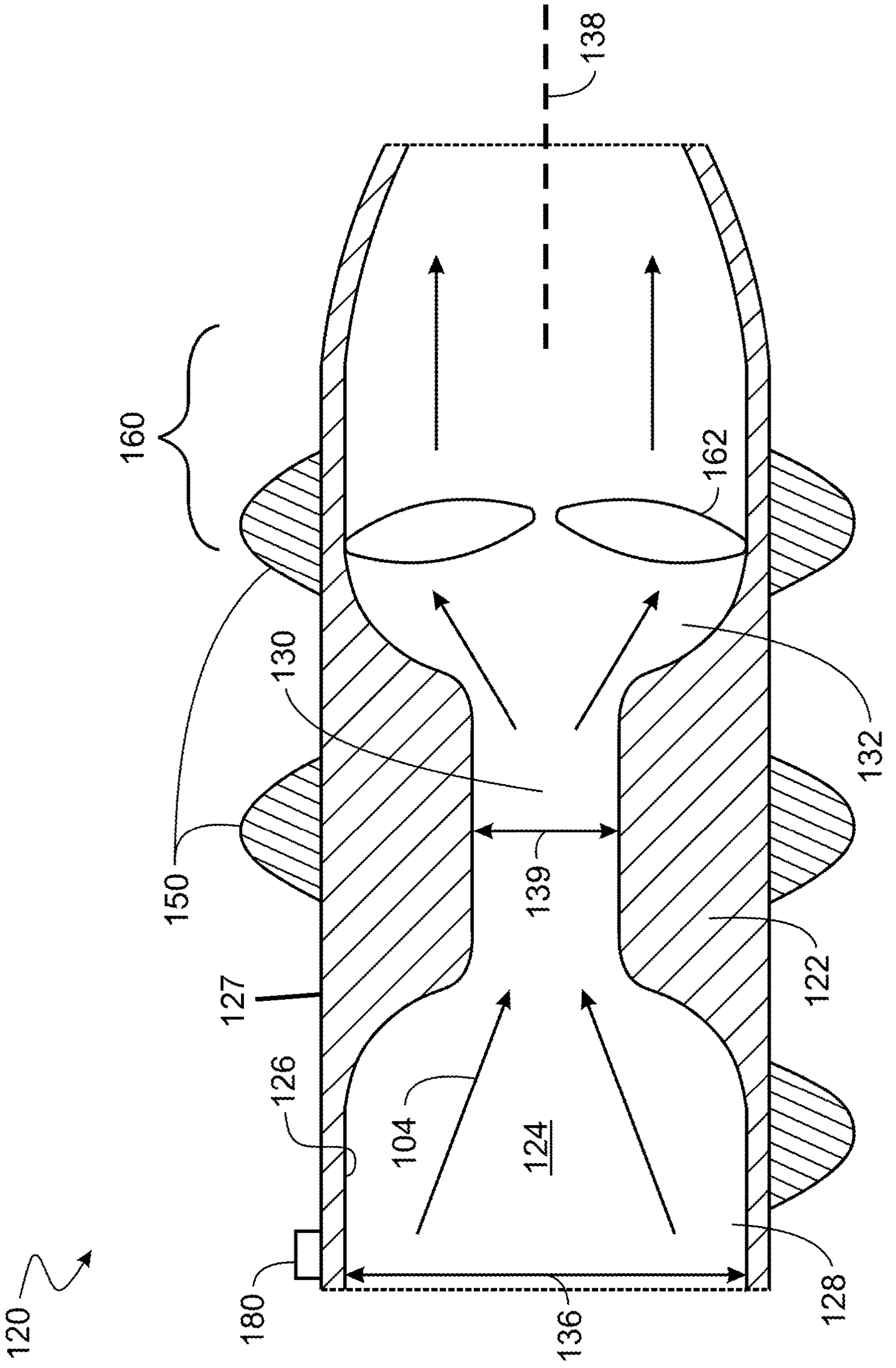

FIGS. 1A-1B are schematic illustrations of a pipeline pig in accordance with an embodiment of the present disclosure. Referring to FIGS. 1A, pipeline system 100 includes a hollow, tubular pipe 102 configured to be a conveyance for a fluid 104 between two or more locations. Pipe 102 can be comprised of multiple tubular segments or a single continuous segment. Fluid 104 can be, for example, oil, gas, water, or another substance or mixture of substances, in a gaseous phase, liquid phase, or multi-phase state. Pipe 102 can be positioned on a terranean surface; however, alternatively, at least a portion of the pipe 102 can be positioned or buried under the terranean surface. Alternative implementations include the pipe 102 that extends at least partially under a body of water, such as a lake, gulf, ocean, river, or otherwise.

As shown in this example, a layer of scale 108 has accumulated on the interior walls 110 of pipe 102. Common scale can be comprised of carbonate, sulfate, silicates, calcium phosphate, and alumina silicates built up over time. As used herein, "scale" includes not just such common scales but also rust, hydrates, or other undesirable buildup of materials on the interior of a pipe. The formation of such scale 108 can have significant impact on operation of pipe 102 by, for example, increasing a pressure drop per unit length of the pipe 102 thereby increasing pumping costs to move the fluid 104 therethrough. Scale 108 can effectively decrease a cross-sectional area of the pipe 102, thereby constricting flow of the fluid 104 through the pipe 102.

A scraper pig 120 is disposed in the interior of pipe 102. As clearly shown at least in FIG. 1B, pig 120 includes a main body 122 comprising an exterior surface 127 and an interior surface 126. The interior surface 126 of the main body defines a conduit 124 (shown in the cross-sectional view of FIG. 1B) extending therethrough the main body 122 of the pig 120. In the illustrated embodiment, when pig 120 is disposed in pipe 102, longitudinal axis 138 of conduit 124 is parallel and coincident with axis 112 of pipe 102. So disposed within the pipe 102, the force of the flow of a fluid 104 in the pipe 102 can pushes the pig 120 through pipe 102. In the illustrated embodiment, a portion of fluid 104 can flow around main body 122 and a remaining portion can fluid through conduit 124. In some embodiments, the portion flowing around main body 122 is less than the portion flowing through conduit 124. Interior surface 126 of the conduit 124 defines a conical inlet 128 converging to a throat 130 and a conical outlet 132 diverging from throat 130 such that the conduit 124 is venturi-shaped, which can provide benefits as described in greater detail below.

Pig 120 further includes one or more scraper heads 150. Each of the scraper heads 150 can include, for example, one or more sharp blades (which can be stiff or have some degree of flexibility), brush bristles, or other elements configured to abrade or remove scale or ohter material when scraping the inner surface of the pipeline when. Scraper heads 150 can be made of a metallic material, composite material, or another suitable material or combination of materials. In the embodiment shown in FIGS. 1A and 1B scraper heads 150 are disposed on outer surface 140 of the main body 122 such that, as the pressure of the fluid 104 pushes pig 120 through pipe 102, scraper heads 150 scrape against the interior surface 110 of the pipe 102 to dislodge scale 108.

Figure 1C:
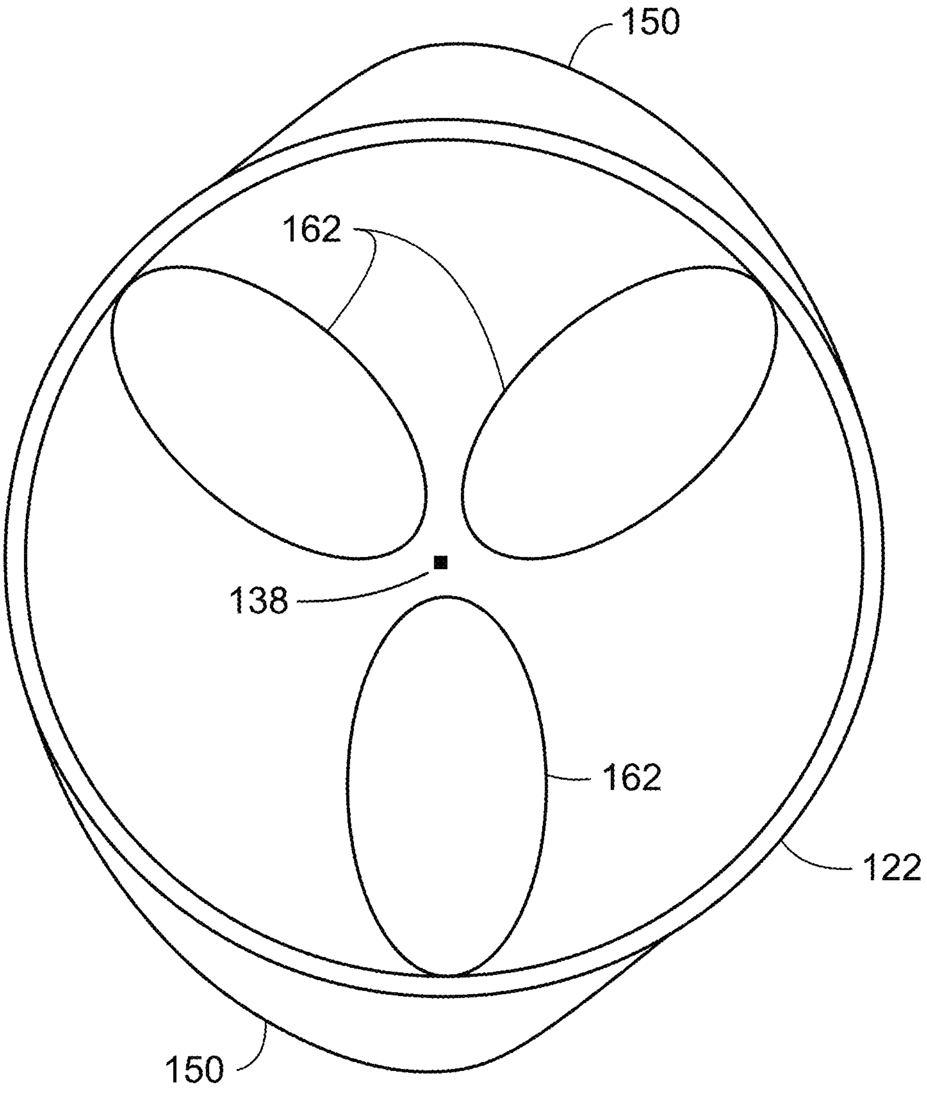

In the illustrated embodiment, pig 120 further includes a turbine assembly 160 comprising a plurality of turbine blades 162 attached to main body 122 and disposed about longitudinal axis 138 within conical outlet 132 (as shown in the cross-sectional view of FIG. 1C. Turbine assembly 160 is positioned and configured such that fluid 104 emerging from throat 130 and flowing past the turbine assembly 160 imparts rotation. In the illustrated embodiment, blades 162 are affixed to main body 122 such that the rotation imparted by turbine assembly 160 rotates main body 122 and thus scraper heads 150 as the scraper heads scrape at least a portion of the interior wall of the pipe. The rotation also acts to stabilize pig 120 as it travels through pipe 102, due to conservation of angular momentum.

In the embodiment shown in FIGS. 1A and 1B scraper heads 150 are disposed in a helical pattern about outer surface 140 such that the flow of fluid 104 around the main body 122 and flowing across the helical heads further imparts the rotation of main body 122.

Because of this venturi (or hourglass) shape, fluid passing through throat 130 has a greater velocity than the velocity of the fluid initially entering conduit 124 at inlet 128, thus enhancing the rotational force provided by turbine blades 162. In some embodiments, conical inlet 128 and conical outlet 132 are symmetrical; i.e., they have the same shape and angle of the cone. In some embodiments, conical inlet 128 and conical outlet 132 are asymmetrical. For example, in some embodiments, inlet 128 can have an entry cone of 30 degrees and outlet 132 can have a longer length than inlet 128 and have an exit cone of about 5 degrees. In the illustrated embodiment, main body 122 of pig 120 has a conical or semi-conical nose section 126. The venturi shape can also modify the flow (for example, reduce its turbulence), enhancing flow velocity through the conduit and enhancing stability of the pig.

In the illustrated embodiment, inner diameter 106 of pipe 102 is about 24 inches and the outer diameter 134 of pig 120 is about 21 inches. In some embodiments, the ratio of the maximum inner diameter 136 of conduit 124 to the minimum inner diameter 139 of throat 130 can be about 20:1. In some embodiments, the ratio can be higher or lower (for example, 2:1) In some embodiments, the maximum inner diameter 136 of conduit 124 can be about 21 inches, 19 inches, or another suitable diameter, and the minimum inner diameter of throat 130 can be about 5 inches, 15 inches, or another suitable diameter. The respective diameters of the conduit 124 and throat 130 can be chosen such that pig 120 can travel at a desired velocity and force through pipeline 102, driven by the force of the flow of fluid 104. In some embodiments, the central conduit is a simple choke orifice instead of a venturi-shaped conduit.

In the illustrated embodiment, pig 120 further includes one or more scale thickness sensors 180. Sensors 180 can emit electromagnetic waves towards the pipeline inner face and the receive the reflected wave. In some embodiments, the wave has a frequency of 100 to 200 GHz, or can have another suitable frequency. A travel distance of the wave can be calculated based on the travel time of the wave, based on conventional methods. If the calculated distance is less than the distance 182 from the sensor to the inner wall 110 of pipe 102, then this is an indication of incomplete removal of scale. Shorter travel time can correspond to thicker scale buildup. In some embodiments, thickness sensors 180 can include an on-board battery and a suitable microprocessor, memory, and communication systems. In some embodiments, a pig can include only one thickness sensor. In other embodiments, pig 120 can include multiple sensors disposed radially about the outer surface 140 of main body 122.

Figure 1D:
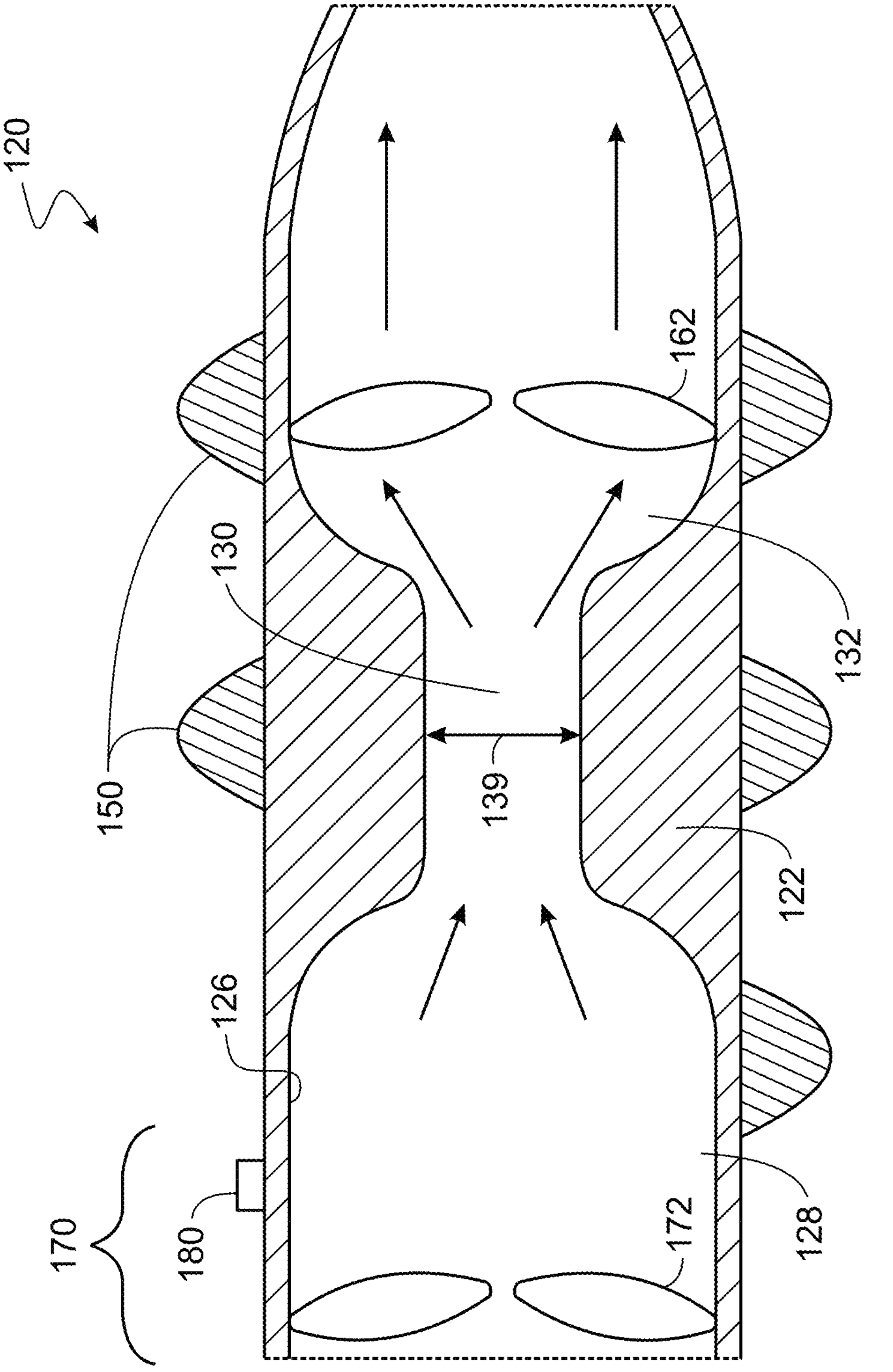

In some embodiments, pig 120 can further include additional turbine assemblies. For example, in the embodiment shown in FIG. 1D, pig 120 can include a second turbine assembly 170 disposed in conical inlet 128. Like turbine assembly 160, turbine assembly 170 includes a plurality of turbine blades 172 disposed about longitudinal axis 138. In the embodiment shown in FIG. 1C, turbine assembly 160 and turbine assembly 170 are positioned on opposite sides of throat 130.

Figure 2:
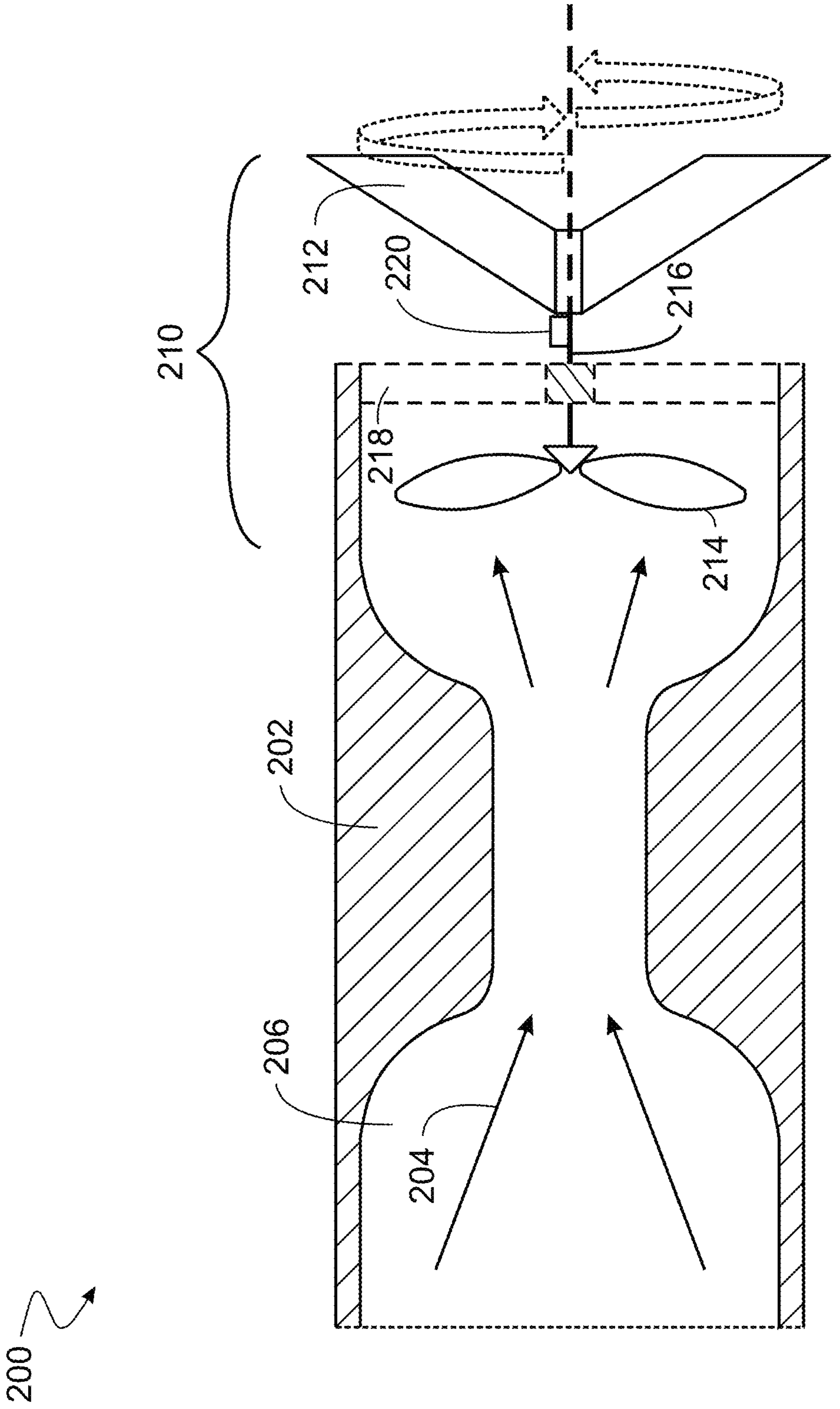
FIG. 2 is a schematic illustration of a pipeline pig in accordance with an alternative embodiment of the present disclosure.

FIG. 2 illustrates an embodiment of a pig 200 that is similar to pig 120 of FIGS. 1A-1D but that includes a turbine assembly 210 affixed to a shaft 216 (extending through strut assembly 218) that can rotate independently of main body 202. Scraper heads 212 are connected to turbine blades 214 via shaft 216. As fluid 204 flows through venturi-shaped conduit 206 it imparts rotation of blades 214 about shaft 216 and thus rotation of scraper heads 212 against the interior surface of the pipe. While in the embodiment shown in FIG. 2 the scraper heads are affixed to the turbine blades via shaft 216, in other embodiments scraper heads can be affixed to the turbine blades directly (for example, by being attached to the ends of the blades). Scraper heads 212 can be in addition to scraper heads disposed on outer surface of main body 202.

In the embodiment shown in FIG. 2, a thickness sensor 220 is attached to shaft 216. As pig 200 travels down the pipe and shaft 216 rotates in response to the fluid flow, sensor 220 rotates 360° and transmits waves and receives reflective waves. Based on the received data, thickness of scale buildup of the entire circumference of the inner wall of the pipe can be determined, along the length of the pipe.

Figure 3:
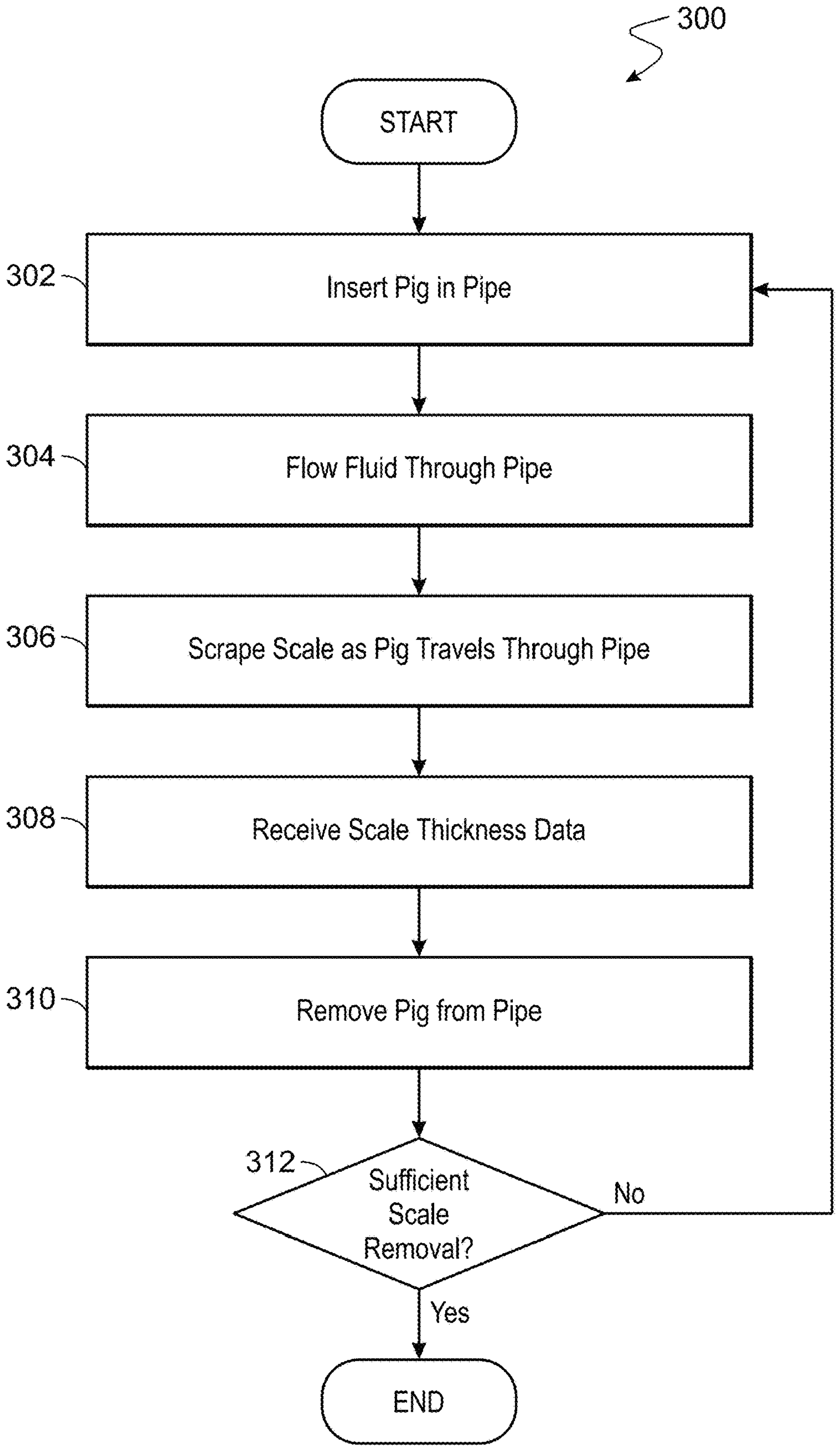
FIG. 3 is a process flow diagram of a method of pipe scale removal accordance with embodiments of the present disclosure.

FIG. 3 describes a method 300 of removing scale from a pipe. Method 300 begins at step 302 in which a scraper pig—such as pig 120 of FIGS. 1A-1C or pig 200 of FIG. 2—is disposed in a pipe of a pipeline system. Proceeding to step 304, fluid is flowed through the pipe. Driven by the flow of fluid, at step 306, the pig travels down the pipe and the scraper heads, driven by the fluid flow, rotate to remove the scale from the interior of the pipe. At step 306, scale thickness sensor data can be received from on on-board thickness sensor (which in some embodiments can be simultaneously with the travel of the pig). At step 308, the pig is removed from the pipe. At step 310, if the scale thickness data indicates that the scale removal been to a sufficient degree, the method returns to step 302, in which the pig is again placed in the pipe to be propelled through in steps 304-310. If at step 312 the measurements from the scale thickness sensor indicate that scale has been removed to a sufficient degree, scale removal operations can end.

While this specification contains many specific implementation details, these should not be construed as limitations on the scope of any claims or of what may be claimed, but rather as descriptions of features specific to particular implementations. Certain features that are described in this specification in the context of separate implementations can also be implemented in combination in a single implementation. Conversely, various features that are described in the context of a single implementation can also be implemented in multiple implementations separately or in any suitable sub-combination. Moreover, although features may be described as acting in certain combinations and even initially claimed as such, one or more features from a claimed combination can in some cases be excised from the combination, and the claimed combination may be directed to a sub-combination or variation of a sub-combination.

A number of implementations have been described. Nevertheless, it will be understood that various modifications may be made without departing from the spirit and scope of the disclosure. For example, example operations, methods, or processes described herein may include more steps or fewer steps than those described. Further, the steps in such example operations, methods, or processes may be performed in different successions than that described or illustrated in the figures.

EXAMPLES

In a first aspect, a scraper pig for cleaning an interior wall of a tubular pipe includes a main body with a conduit extending therethrough. An interior surface of the conduit defines a conical inlet converging to a throat and a conical outlet diverging from the throat such that the conduit is venturi-shaped. The scraper head further includes one or more scraper heads and a plurality of turbine blades. The turbine blades are disposed in the conical outlet about a longitudinal axis of the conduit. The scraper pig is configured such that, when the pig is disposed within the pipe, the longitudinal axis of the conduit is parallel to and coincident with a longitudinal axis of the pipe, and, as a fluid flowing in the pipe pushes the pig through the pipe, at least a portion of the fluid flows into the conduit and through the throat and thence across the plurality of turbine blades, thereby imparting rotation on the one or more scraper heads as the scraper heads scrape at least a portion of the interior wall of the pipe.

In a second aspect in accordance with the first aspect, the plurality of turbine blades are affixed to the main body and the one or more scraper heads are disposed on an outer surface of the main body, such that the imparting rotation to the one or more scrapers comprises imparting rotation to the main body.

In a third aspect in accordance with the first or second aspects, the plurality of turbine blades comprises a first plurality of turbine blades and wherein the pig further comprises a second plurality of turbine blades disposed in the conical inlet.

In a fourth aspect in accordance with any of the first to third aspects, the scraper pig further includes a scale thickness detection sensor.

In a fifth aspect in accordance with the fourth aspect, the scale thickness detection sensor is or includes an electromagnetic sensor.

In a sixth aspect in accordance with any of the first to fifth aspects, the plurality of turbine blades are affixed to a shaft, an axis of which is parallel and coincident with the longitudinal axis of the conduit, and the one or more scraper heads are affixed to and extend from the shaft, such that the turbine blades and the one or more scraper heads rotate with the shaft independently of the main body.

In a seventh aspect in accordance with the sixth aspect, the scraper pig further includes a scale thickness detector affixed to the shaft such that the detector rotates with the shaft.

In an eighth aspect, a pipeline system includes a tubular pipe, a fluid flowing through the pipe, and a scraper pig for cleaning an interior wall of the tubular pipe. The scraper pig includes a main body with a conduit extending therethrough. An interior surface of the conduit defines a conical inlet converging to a throat and a conical outlet diverging from the throat such that the conduit is venturi-shaped. The scraper head further includes one or more scraper heads and a plurality of turbine blades. The turbine blades are disposed in the conical outlet about a longitudinal axis of the conduit. The scraper pig is configured such that, when the pig is disposed within the pipe, the longitudinal axis of the conduit is parallel to and coincident with a longitudinal axis of the pipe, and, as a fluid flowing in the pipe pushes the pig through the pipe, at least a portion of the fluid flows into the conduit and through the throat and thence across the plurality of turbine blades, thereby imparting rotation on the one or more scraper heads as the scraper heads scrape at least a portion of the interior wall of the pipe.

In a ninth aspect in accordance with the eighth aspect, the turbine blades are affixed to the main body and the one or more scraper heads are disposed on an outer surface of the main body, such that the imparting rotation to the one or more scraper heads comprises imparting rotation to the main body.

In a tenth aspect in accordance with the eighth or ninth aspects, the plurality of turbine blades comprises a first plurality of turbine blades and the pig further comprises a second plurality of turbine blades disposed in the conical inlet.

In an eleventh aspect in accordance with the any of the eighth to tenth aspects, the pig further includes a scale thickness detection sensor.

In a twelfth aspect in accordance with the eleventh aspect, the scale thickness detection sensor is or includes an electromagnetic sensor.

In a thirteenth aspect in accordance with any of the eighth to twelfth aspects, the plurality of turbine blades are affixed to a shaft, an axis of which is parallel and coincident with the longitudinal axis of the conduit, and the one or more scraper heads are affixed to and extend from the shaft, such that the turbine blades and the one or more scraper heads rotate with the shaft independently of the main body.

In a fourteenth aspect in accordance with the thirteenth aspect, the scraper pig further includes a scale thickness detector affixed to the shaft such that the detector rotates with the shaft.

In a fifteenth aspect, a method includes disposing a scraper pig into a tubular pipe of a pipeline system. The scraper pig includes a main body with a conduit extending therethrough. An interior surface of the conduit defining a conical inlet converging to a throat and a conical outlet diverging from the throat such that the conduit is venturi-shaped. The scraper pig further includes one or more scraper heads and a plurality of turbine blades. The turbine blades are disposed in the conical outlet about a longitudinal axis of the conduit. The method further includes flowing a fluid through the pipe, thereby pushing the pig through the pipe and dislodging, by the one or more scraper heads, material from the interior surface of the pipe, at least a portion of the fluid flowing into the conduit and through the throat and thence across the plurality of turbine blades, thereby imparting rotation on the one or more scraper heads as the scraper heads scrape at least a portion of the interior wall of the pipe.

In a sixteenth aspect in accordance with the fifteenth aspect, the turbine blades are affixed to the main body and the one or more scraper heads are disposed on an outer surface of the main body, such that the imparting rotation to the one or more scrapers comprises imparting rotation to the main body.

In a seventeenth aspect in accordance with the fifteenth or sixteenth aspects, the plurality of turbine blades comprises a first plurality of turbine blades and the pig further includes a second plurality of turbine blades disposed in the conical inlet.

In an eighteenth aspect in accordance with any of the fifteenth to seventeenth aspects, the scraper pig further includes an electromagnetic scale thickness detection sensor and the method further comprises receiving measurements from the scale thickness detection sensor as the scraper pig is pushed through the pipe.

In a nineteenth aspect in accordance with any of the fifteenth to eighteenth aspects, the plurality of turbine blades are affixed to a shaft, an axis of which is parallel and coincident with the longitudinal axis of the conduit, and the one or more scraper heads are affixed to and extend from the shaft, such that the turbine blades and the one or more scraper heads rotate independently of the main body.

In a twentieth aspect in accordance with the nineteenth aspect, the scraper pig further includes a scale thickness detector affixed to the shaft such that the detector rotates with the shaft.

What is claimed is:

1. A scraper pig for cleaning an interior wall of a tubular pipe, the scraper pig comprising:

a main body with a conduit extending therethrough, wherein:

an interior surface of the conduit is disposed about a central longitudinal axis of the main body, the interior surface of the conduit defines a conical inlet converging to a throat and a conical outlet diverging from the throat, such that the conduit is venturi-shaped, and the main body is formed such that fluid communication cannot occur between an exterior surface of the main body and the interior surface of the conduit between the conical inlet and the conical outlet;

one or more scraper heads; and a plurality of turbine blades entirely disposed in the conical outlet about the central longitudinal axis of the conduit, wherein the plurality of turbine blades protrude from the interior surface of the conduit of the main body towards the central longitudinal axis but do not overlap with the central longitudinal axis, and wherein the scraper pig is configured such that:

when the pig is disposed within the pipe, the central longitudinal axis of the conduit is parallel to and coincident with a central longitudinal axis of the pipe; and as a fluid flowing in the pipe pushes the pig through the pipe, at least a portion of the fluid flows into the conduit, through the throat, and thence across the plurality of turbine blades, thereby imparting rotation on the one or more scraper heads as the scraper heads scrape at least a portion of the interior wall of the pipe.

2. The scraper pig of claim 1, wherein the one or more scraper heads are disposed on an outer surface of the main body, such that the imparting rotation to the one or more scraper heads comprises imparting rotation to the main body.

3. The scraper pig of claim 1, wherein:

the plurality of turbine blades comprises a first plurality of turbine blades; and the pig further comprises a second plurality of turbine blades entirely disposed in the conical inlet about the central longitudinal axis.

4. The scraper pig of claim 3, wherein the second plurality of turbine blades also protrude from the interior surface of the conduit towards the central longitudinal axis but also do not overlap with the central longitudinal axis.

5. The scraper pig of claim 1, further comprising a scale thickness detection sensor.

6. The scraper pig of claim 5, wherein the scale thickness detection sensor comprises an electromagnetic sensor.

7. The scraper pig of claim 5, wherein the pig comprises multiple scale thickness detection sensors disposed radially about an outer surface of the main body of the pig.

8. A pipeline system comprising:

a tubular pipe;

a fluid flowing through the pipe; and a scraper pig for cleaning an interior wall of the tubular pipe, the scraper pig comprising:

a main body with a conduit extending therethrough, wherein:

an interior surface of the conduit is disposed about a central longitudinal axis of the main body, the interior surface of the conduit defines a conical inlet converging to a throat and a conical outlet diverging from the throat such that the conduit is venturi-shaped, and the main body is formed such that fluid communication cannot occur between an exterior surface of the main body and the interior surface of the conduit between the conical inlet and the conical outlet;

one or more scraper heads; and a plurality of turbine blades entirely disposed in the conical outlet about the central longitudinal axis of the conduit, wherein the plurality of turbine blades protrude from the interior surface of the conduit of the main body towards the central longitudinal axis but the plurality of turbine blade do not overlap with the central longitudinal axis, and wherein the scraper pig configured such that:

when the pig is disposed within the pipe, the longitudinal axis of the conduit is parallel to and coincident with a longitudinal axis of the pipe; and as a fluid flowing in the pipe pushes the pig through the pipe, at least a portion of the fluid flows into the conduit, through the throat, and thence across the plurality of turbine blades, thereby imparting rotation on the one or more scraper heads as the scraper heads scrape at least a portion of the interior wall of the pipe.

9. The pipeline system of claim 8, wherein the one or more scraper heads are disposed on an outer surface of the main body, such that the imparting rotation to the one or more scraper heads comprises imparting rotation to the main body.

10. The pipeline system of claim 8, wherein;

the plurality of turbine blades comprises a first plurality of turbine blades; and the pig further comprises a second plurality of turbine blades entirely disposed in the conical inlet about the central longitudinal axis.

11. The pipeline system of claim 10, wherein the second plurality of turbine blades also protrude from the interior surface of the conduit towards the central longitudinal axis but also do not overlap with the central longitudinal axis.

12. The pipeline system of claim 8, wherein the pig further comprising a scale thickness detection sensor.

13. The pipeline system of claim 12, wherein the scale thickness detection sensor comprises an electromagnetic sensor.

14. The pipeline system of claim 12, wherein the pig comprises multiple scale thickness detection sensors disposed radially about an outer surface of the main body of the pig.

15. A method comprising:

disposing, into a tubular pipe of a pipeline system, a scraper pig, the scraper pig comprising:

a main body with a conduit extending therethrough, wherein an interior surface of the conduit is disposed about a central longitudinal axis of the main body, wherein the interior surface of the conduit defines a conical inlet converging to a throat and a conical outlet diverging from the throat such that the conduit is venturi-shaped, and wherein the main body is formed such that fluid communication cannot occur between an exterior surface of the main body and the interior surface of the conduit between the conical inlet and the conical outlet;

one or more scraper heads; and a plurality of turbine blades entirely disposed in the conical outlet about a longitudinal axis of the conduit, wherein the plurality of turbine blades protrude from the interior surface of the conduit of the main body towards the central longitudinal axis but do not overlap with the central longitudinal axis; and flowing a fluid through the pipe, into the conduit, through the throat, and thence across the plurality of turbine blades, thereby imparting rotation on the one or more scraper heads as the scraper heads scrape at least a portion of an interior wall of the pipe, and thereby also pushing the pig through the pipe and dislodging, by the one or more scraper heads, material from the interior surface of the pipe.

16. The method of claim 15, wherein the one or more scraper heads are disposed on an outer surface of the main body, such that the imparting rotation to the one or more scraper heads comprises imparting rotation to the main body.

17. The method of claim 15, wherein;

the plurality of turbine blades comprises a first plurality of turbine blades; and the pig further comprises a second plurality of turbine blades entirely disposed in the conical inlet about the central longitudinal axis.

18. The method of claim 17, wherein the second plurality of turbine blades also protrude from the interior surface of the conduit towards the central longitudinal axis but also do not overlap with the central longitudinal axis.

19. The method of claim 15, wherein the scraper pig further comprises an electromagnetic scale thickness detection sensor and the method further comprises receiving measurements from the scale thickness detection sensor as the scraper pig is pushed through the pipe.

20. The method of claim 15, wherein:

the pig comprises multiple electromagnetic scale thickness detection sensors disposed radially about an outer surface of the main body of the pig; and the method further comprises receiving measurements from the multiple electromagnetic scale thickness detection sensors as the scraper pig is pushed through the pipe.

* * * * *